.6-365
4/28/87 RE 32,407

United States Patent [19]

Mengshoel et al.

[11] E Patent Number: Re. 32,407

[45] Reissued Date of Patent: Apr. 28, 1987

[54] COMBINED SEAT AND BACKREST UNIT FOR A CHAIR

[76] Inventors: Hans C. Mengshoel, Bygdöy Alle 12, Oslo 2; Oddvin Rykken, 5610 Öystese, Öystese, both of Norway

[21] Appl. No.: 768,427

[22] Filed: Aug. 22, 1985

Related U.S. Patent Documents

Reissue of:

[64] Patent No.: D. 272,873
Issued: Mar. 6, 1984
Appl. No.: 313,247
Filed: Oct. 21, 1981

[51] Int. Cl. ..... D6/01
[52] U.S. Cl. ..... D6/365
[58] Field of Search ..... D6/334, 364, 365, 366

[56] References Cited

U.S. PATENT DOCUMENTS

| | | | |
|---|---|---|---|
| D. 224,189 | 7/1972 | Gorelick | D6/365 |
| D. 240,476 | 7/1976 | Rodriquez | D6/365 |
| D. 255,293 | 6/1980 | Locher | D6/366 |

OTHER PUBLICATIONS

Domus Catalog, Aug. 1962, p. 48, Chair top left.

*Primary Examiner*—Bruce W. Dunkins
*Attorney, Agent, or Firm*—Darby & Darby

CLAIM

The ornamental design for a combined seat and backrest unit for a chair, substantially as shown and described.

DESCRIPTION

Figure 2:
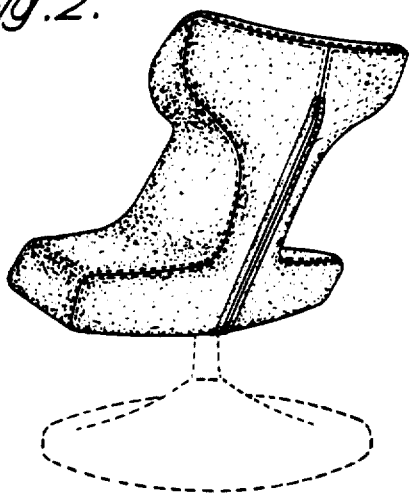
FIG. 2 is a rear perspective view from below of the chair.
Figure 1:
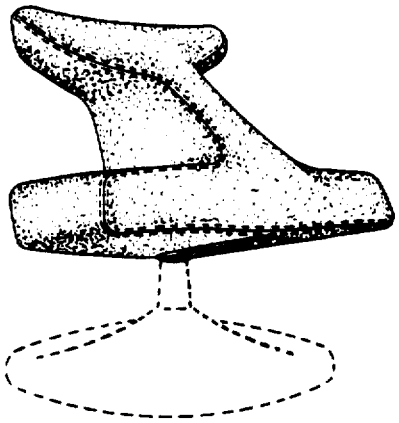
FIG. 1 is a front perspective view from above of the chair embodying our new design.
Figure 3:
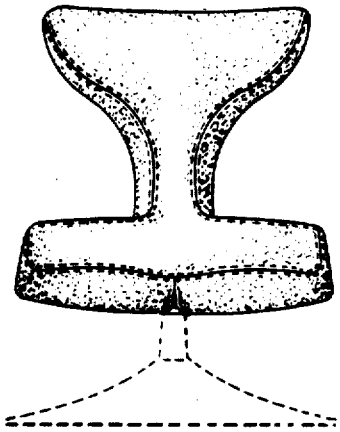
FIG. 3 is a front view of the chair.
Figure 4:
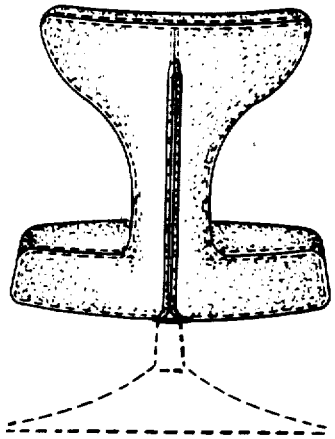
FIG. 4 is a rear view of the chair.
Figure 6:
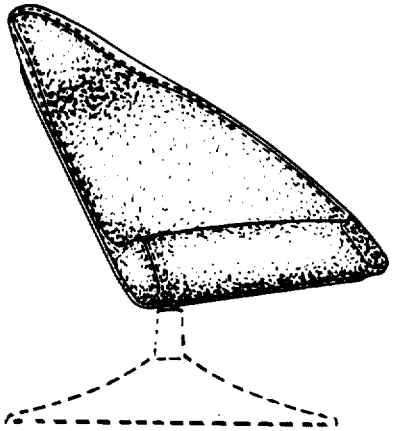
FIG. 6 is a side view of the chair.
Figure 5:
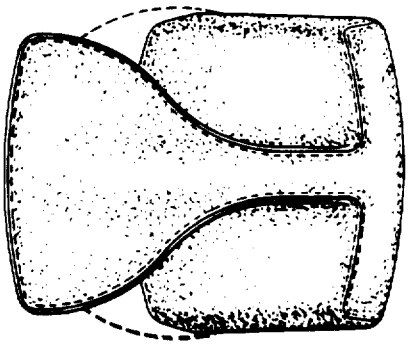
FIG. 5 is a plan view of the chair.

The broken lines disclosing a chair base in FIGS. 1-3 are shown for illustrative purposes only.

1 Claim, 6 Drawing Figures